Patented June 24, 1930

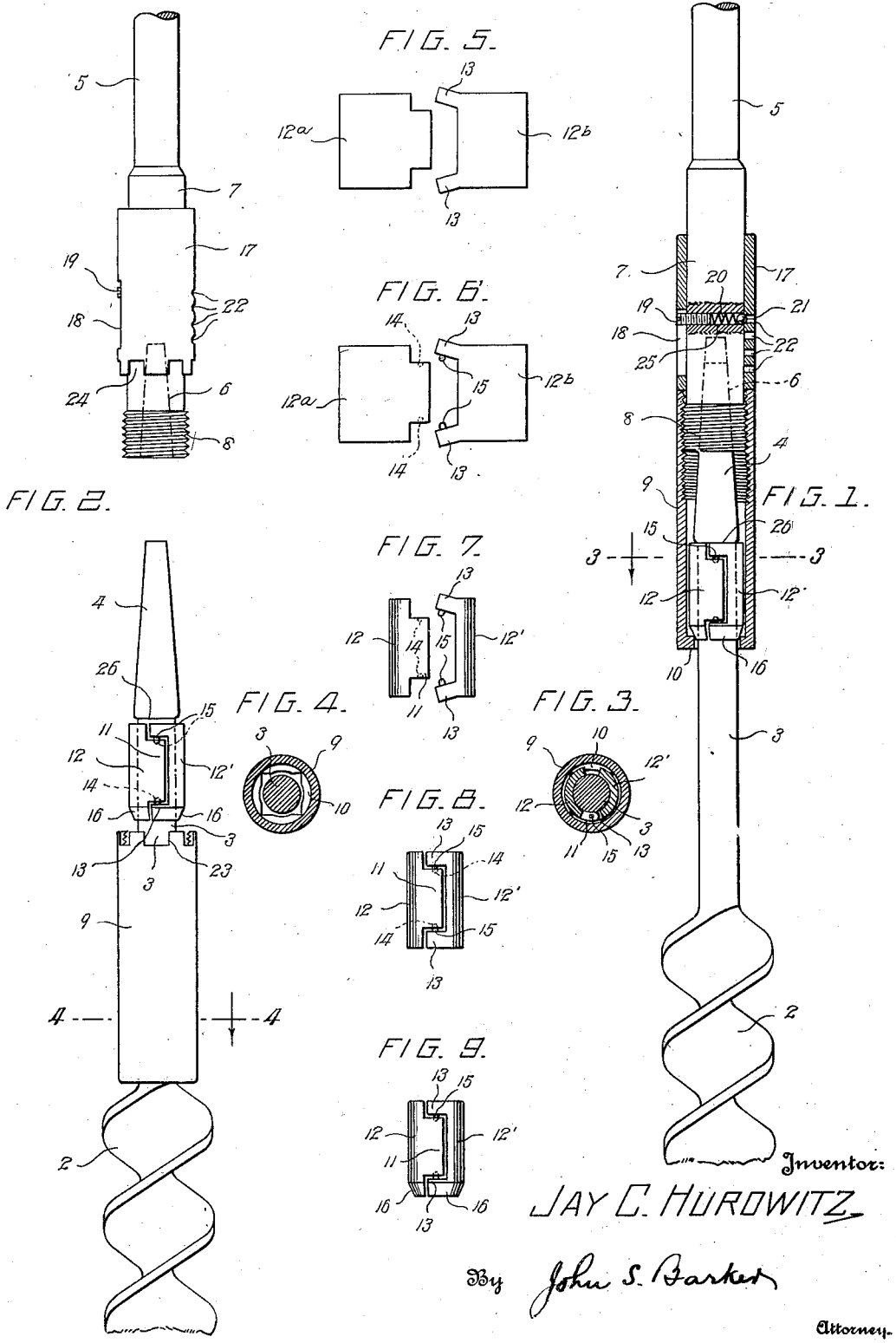

1,768,066

UNITED STATES PATENT OFFICE

JAY C. HUROWITZ, OF NEW YORK, N. Y., ASSIGNOR TO L. W. JONES TOOL COMPANY, INCORPORATED, A CORPORATION OF NEW YORK

TOOL HOLDER

Application filed October 5, 1927. Serial No. 224,201.

My invention relates to tool holders, bit stocks and chucks, such as are used in connection with various tools, such, for instance as boring bits, it having been devised with especial reference to being used in extension bits, such as are commonly employed by electricians making openings through the walls for electric conduits and conductors. These tools have frequently to be used in inaccessible places, requiring employment either of a very long tool or else of a long tool holder. Sometimes the auger or bit being used becomes stuck in the hole being formed, making it difficult to extract it.

My invention has particularly for its object to produce a tool holder that, having been once made to engage with the tool, will maintain such engagement during all of the ordinary uses to which such tool would be subjected without liability of the grip of the holder becoming loosened. I have illustrated in the accompanying drawings my invention applied to a boring bit and the holder or carrier therefor.

Fig. 1 is an elevation, with parts in longitudinal section, showing the invention applied to a holder for an auger or wood boring tool, the parts being assembled in working relationship.

Fig. 2 is an elevation of the parts shown in Fig. 1, these, however, being separated from each other.

Fig. 3 is a transverse sectional view taken on the line 3, 3 of Fig. 1.

Fig. 4 is a transverse sectional view taken on the line 4, 4 of Fig. 2.

Figs. 5, 6, 7, 8, and 9 are views illustrating the several steps employed in producing the clamping jaws or shells of the tool holder.

Referring to the drawings, 2 indicates the tool, in this instance a wood boring auger. It is formed with the usual shank 3 and a tapering head 4, preferably angular in cross section. 5 designates the driving spindle of the tool holder or carrier in the end 7 of which is formed a socket 6 to receive the head of the tool, such head being at its end externally screw-threaded, as indicated at 8, to receive a sleeve 9, adapted to fit over the head of the tool and the adjacent portion of the shank 3 thereof when the parts are assembled as shown in Fig. 1. The outer end of this sleeve is formed with an inturned flange 10, surrounding the opening, which is preferably of a size and shape to permit it to pass over the angular head 4 of the tool, see Fig. 4.

12, 12' indicate a pair of clamping jaws adapted to encircle the stem 3 of the tool and to lie within the sleeve 9 when the parts are assembled. Each jaw is a shell, of arc shape in cross section, as represented in Fig. 3, adapted to fit the shank of the tool when applied thereto. The jaws are pivotally united by a hinge or pivotal connection that is parallel with the axis of the shank of the tool when the jaws are applied thereto. Such connection insures that the two clamping jaws shall be permanently united in working relationship preventing their separation and always maintaining them in proper relationship for application to the tool and for engagement therewith. The jaws are preferably beveled circumferentially at one end, as indicated at 16, and with these beveled portions engage the inturned flange 10 of the sleeve 9.

The invention thus far described is used as follows:

The sleeve 9 is slipped over the head 4 of the tool and moved forward along the shank thereof, leaving a portion of the latter between the sleeve and the head 4 exposed. The jaws 12, 12' are then opened upon their hinge connections and applied to the said exposed portion of the shank of the tool and caused to surround and embrace the same as represented in Fig. 2.

The sleeve 9 is then slipped over the jaws, the tapering head of the tool is inserted into the socket 6 in the tool holder, and the sleeve 9 caused to engage with the screw-threaded end 8 at the end of the tool holder. The engagement of the sleeve with the thread of the tool holder draws the parts together into the positions represented in Fig. 1, the inner ends of the jaws resting against the shoulder 26 of the head of the tool and the flange 10 at the end of the sleeve engaging with the beveled portions 16 of the jaws, causing the latter to be forced into clamping and holding engagement with the tool, which is thus tightly forced into the socket 6 and there held securely. The jaws 12, 12' grip the stem of the tool well in advance of the socket 6, which is an advantage, and they are entirely concealed and protected by the sleeve 9.

In order to lock the sleeve 9 in position to hold the jaws in tight clamping engagement with the stem of the tool, I mount upon the head 7 of the tool holder a locking sleeve 17. The end of this sleeve is crenulated as at 24 to engage a similarly crenulated end of the sleeve 9.

Through the sleeve 17 is formed a longitudinal slot 18 in which lies the exposed portion of a screw 19 that is seated in a diametric opening 25 through the head 7 of the stem of the tool carrier. This pin or screw 19 limits the extent of longitudinal movement of the sleeve and prevents it from rotative movement. On the side of the sleeve opposite the slot 18 is a series of holes or perforations 22. A coiled spring 20 is inserted in the hole 25, its end resting against the inner end of the screw-threaded pin 19, and against the outer end of this spring rests a metal ball 21, which, when forced into the hole 25, puts the spring under tension. The ball 21 thus acts as a spring detent to yieldingly hold the sleeve in the position to which it may be adjusted, by partially entering one of the holes 22. The clamping sleeve 9 having been screwed into position to cause the jaws to properly grip the shank of the tool, the locking sleeve 17 is pushed forward until the crenulated ends 23 and 24 of the two sleeves intermesh. This engagement will prevent any accidental or unintentional turning of the clamping sleeve 9, and hence any loosening of the gripping action of the jaws 12, 12', and it is maintained by the spring detent 21, which latter, however, permits the locking sleeve to be slid back to disengage the clamping sleeve whenever this becomes desirable.

The method of making and assembling the clamping jaws 12, 12' is represented in Figs. 5 to 9 inclusive. The first step in the manufacture is to cut out blanks from sheet metal, as represented at 12ª, 12ᵇ Fig. 5. The blank 12ª is formed with a central, relatively long, knuckle 11, while the blank 12ᵇ is formed with two relatively short knuckles adapted to straddle or embrace the knuckle 11. When the blank 12ᵇ is formed the knuckles 13 flare, as represented in Fig. 5. The next steps in the manufacture, which are represented in Fig. 6, are to form recesses 14 in the ends of the knuckle 11 and teats 15 on the inner faces of the knuckles 13, this being done by suitable dyes. The third step is to curve the flat blanks 12ª and 12ᵇ to form the clamping shell-like jaws 12 and 12', and this step is indicated in Fig. 7.

The next step in the manufacture is to assemble the two jaws, which is done by inserting the longer knuckle 11 of the jaw 12 between the shorter outside knuckles 13 of the jaw 12', and then by a suitable press bending the knuckles 13 into the positions represented in Fig. 8, causing the teats 15 to enter the recesses 14, thus uniting the two jaws by hinge-like connections. The final step in the manufacture, which preferably takes place after the jaws have been hinged together, is to bevel one end thereof as indicated at 16, and the finished product shown in Fig. 9 results. In the manufacture of the clamping jaws as just described I prefer that teats 15 should be integral with the knuckles which carry them. While these teats are shown as carried by the shorter, bendable knuckles 13, and the recesses are formed in the broad knuckle 11, it is evident that this is a mere arrangement of expediency rather than an essential feature of the invention, as the location of the teats and recesses might be reversed. That shown, however, is the preferred arrangement.

What I claim is:

1. A holder for boring and similar tools, comprising a socketed spindle, a pair of curved jaws adapted to encircle and clamp the shank of the tool, a sleeve sliding over the jaws for forcing them into clamping engagement with the tool, said sleeve having screw-threaded engagement with the spindle, another sleeve having sliding engagement upon the spindle, and spring pressed means carried by said spindle for restraining the latter sleeve against rotation, the two sleeves having their ends constructed to interlock when the sliding sleeve is moved toward the clamp sleeve.

2. A tool holder consisting of a socketed spindle, screw-threaded near its end, and through which is formed a transverse opening, clamping jaws for engaging with the shank of a tool inserted in the socket of the spindle, a sleeve having screw-threaded engagement with the spindle constructed to close the clamping jaws and force them into engagement with the tool shank and also to operate to hold the tool in the socket in the spindle, the end of the sleeve being notched, a second, locking sleeve supported upon the spindle, formed with a longitudinal slot and a series of openings diametrically opposite the slot, a pin situated in the transverse opening through the spindle the head of the pin lying in the slot of the locking sleeve permitting the latter to be moved longitudinally but not rotatively, a spring situated within said transverse opening, a ball serving as a detent bearing against the outer end of the said spring and being thereby adapted to be forced selectively into one or another of the openings through the locking sleeve that are opposite the slot therein, the end of the locking sleeve being notched to interengage with the notched edge of the clamping sleeve.

3. Clamping jaws for a tool holder, of cylindrical shape and consisting of arc-shaped, shell-like pieces, one of them having a central broad knuckle extending along one longitudinal edge thereof, and the other having narrower bendable knuckles at the ends of one of its longitudinal edges, between which narrower knuckles the broad knuckle of the first named piece is adapted to lie, and interengaging hinging parts carried between adjacent knuckles and arranged to be brought into engagement when the narrower knuckles are bent toward the intermediate broad knuckle, thereby constituting a hinge connection between the pieces on a line parallel with the longitudinal central axis of the holder.

JAY C. HUROWITZ.